United States Patent [19]

Weinblatt

[11] Patent Number: 4,866,880
[45] Date of Patent: Sep. 19, 1989

[54] PLANT WATERING DEVICE

[76] Inventor: Lee S. Weinblatt, 797 Winthrop Rd., Teaneck, N.J. 07666

[21] Appl. No.: 125,546

[22] Filed: Nov. 25, 1987

[51] Int. Cl.⁴ .............................................. A01G 25/06
[52] U.S. Cl. ........................................ 47/79; 47/48.5; 47/59; 222/650
[58] Field of Search ...................... 47/48.5, 79, 80, 81, 47/59, 60; 111/7.1, 7.2, 7.3, 7.4; 222/650

[56] References Cited

U.S. PATENT DOCUMENTS

| | | | |
|---|---|---|---|
| 588,278 | 8/1897 | Kling | 47/48.5 |
| 1,383,368 | 7/1921 | Ambrose | 47/79 |
| 1,952,597 | 3/1934 | Lizzola | 47/79 |
| 2,253,469 | 8/1941 | Markley | 47/80 |
| 2,791,347 | 5/1957 | Boehm | 47/48.5 X |
| 2,809,468 | 10/1957 | Eliot | 47/44 |
| 3,077,166 | 2/1963 | Delp | 47/48.5 X |
| 3,142,935 | 8/1964 | Campos | 47/48.5 |
| 3,151,415 | 10/1964 | James | 47/48.5 |
| 3,512,712 | 5/1970 | Benesch | 239/63 |
| 3,821,863 | 7/1974 | Chan | 47/48.5 |
| 4,057,933 | 11/1977 | Enyeart | 47/79 |
| 4,077,511 | 3/1978 | Mosijowsky | 47/48.5 X |
| 4,175,356 | 11/1979 | Allen | 47/66 |
| 4,361,983 | 12/1982 | Wilson | 47/48.5 |
| 4,726,143 | 2/1988 | Steinbeck | 47/48.5 |

Primary Examiner—Robert A. Hafer
Assistant Examiner—Sam Rimell
Attorney, Agent, or Firm—Frishauf, Holtz, Goodman & Woodward

[57] ABSTRACT

A device for watering plants adapted to be installed within the soil. It includes a perforated sleeve within which is accommodated a perforated tubular insert. The sets of holes in the insert and sleeve are respectively located so as to be selectively registerable with each other. When these sets of holes are not in registration, the sleeve holes are closed to prevent contaminants from entering and blocking the perforations. This is particularly advantageous when the device is being inserted into the soil. Movement of the insert relative to the sleeve after the device is implanted can be used to bring the perforations into registration with each other to allow the flow of water outward into the soil to nourish the plant. A spiral ridge is provided on the outer periphery of the sleeve to facilitate insertion of the device into the soil by rotation of the sleeve. Also, the top of the device is attachable to a container having a selectively closable opening in its bottom. The container might be used to store a supply of water. A timer is provided to periodically communicate the container with a passage within the device via this opening. Automatic watering of the plant can thus take place.

6 Claims, 2 Drawing Sheets

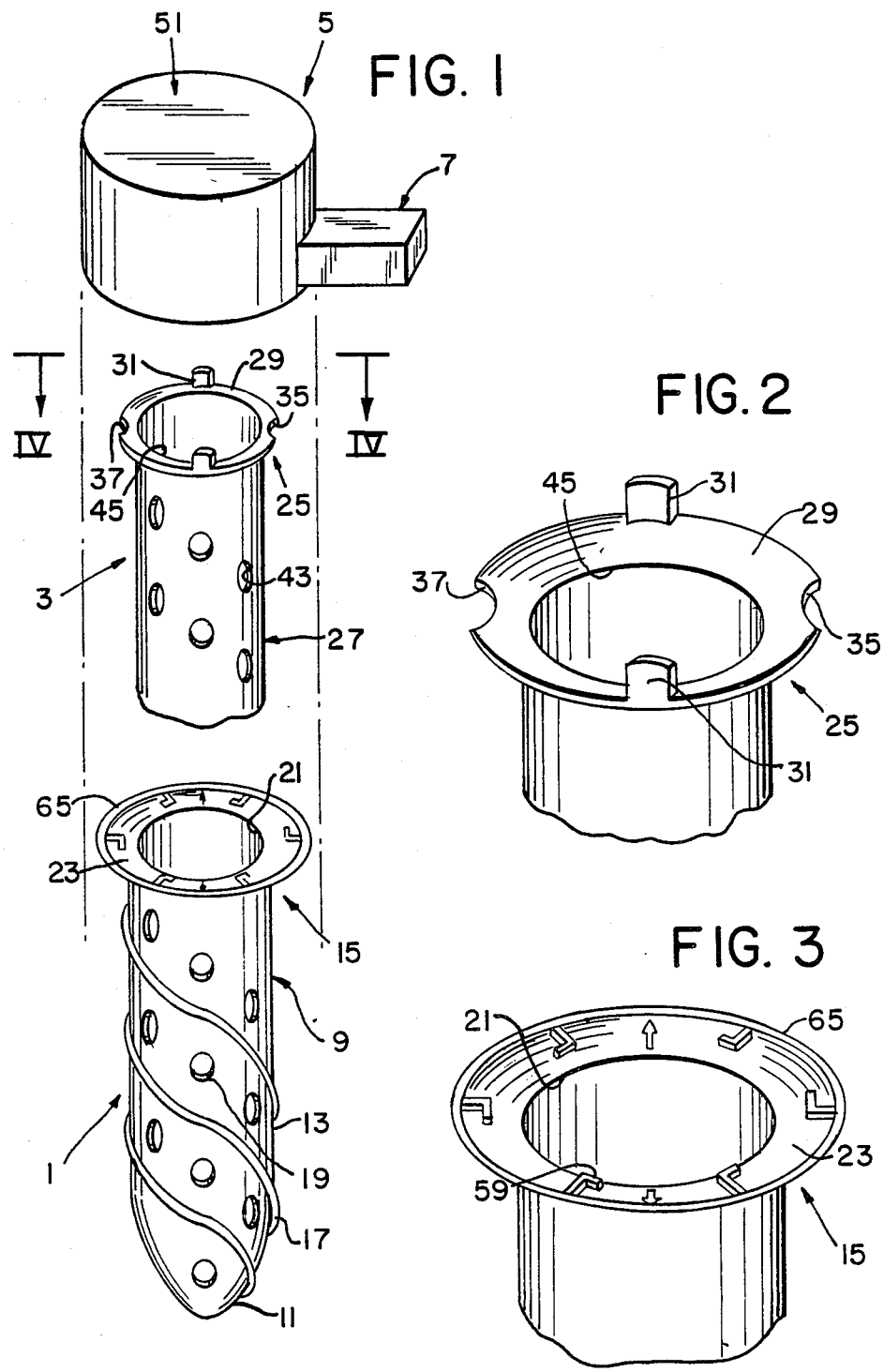

PLANT WATERING DEVICE

BACKGROUND OF THE INVENTION

This invention is directed to a device for watering plants and, in particular, to an elongated member adapted to be installed within the soil and extending from above the soil down toward the plant roots for delivering nutrients thereto, and including improvements to prevent its becoming plugged by soil as it is being installed and by soil and roots while it rests in its installed position.

Plants are normally watered in flower boxes, flower pots and the like by the simple process of pouring water directly onto the top of the soil. This water than supposedly seeps down toward the root system of the plant in order to provide the needed nourishment. In practice, however, the repeated watering in this manner produces a caked upper surface of the soil. The crust which forms there interferes with normal seepage of the water downward so that at the very least, an unequal distribution of water within the pot occurs. Also, the crust thus formed at the surface causes a blockage which prevents air from reaching the plant roots. The consequent improper drainage and aeration of the root system within the container can cause a decay of the root system and the inevitable deterioration of the plant.

It is known to provide a device for watering the root system by inserting a perforated, tubular member into the subsoil. Water poured into the top flows down this member directly towards the root system rather than collecting at the caked upper surface of the soil. See for example, U.S. Pat. Nos. 1,952,597, 1,383,,368, and 4,361,983. However, the latter two approaches are vulnerable to becoming plugged during use by soil which works itself into the holes of the device as well as by roots which will inevitably grow through the holes in search of moisture. The first above-mentioned patent provides a means for periodically cleaning the interior periphery of the device to clean it of dirt, and possibly to even snip off tender roots which may protrude thereinto. However, none of these examples of the prior art discloses a technique for facilitating insertion of such an elongated device of this sort into soil, nor a means for preventing the intrusion of soil into the device while it is being inserted into the soil. It can readily be seen that if a perforated deviced is forcibly pressed into the soil, the soil will tend to, in the process, work its way into the openings, and plugging will result. Furthermore, none of these references shows a technique for cleaning dirt and removing ingrown roots in an insertable device of the type described just above.

Since plants must be regularly provided with their needed amount of nutrients, they may sometimes experience damage when such nourishment cannot be provided by their owner who may be away for a time, for example. Consequently, a need exists for enabling the automatic supply of nourishment despite the absence of someone to provide it in person. Some container combined with a timer mechanism is required. However, the prior art has not provided such a means which can readily be combined with an insertable plant watering device of the type described just above.

SUMMARY OF THE INVENTION

It is the primary object of the present invention to provide a plant watering device for effectively providing nourishment to the root system of a plant.

A more specific object of the present invention is to provide a plant watering device which is readily insertable into soil in such a manner that the holes with which it is perforated do not become plugged.

Another object of the present invention is to provide a plant watering device which does not become plugged by soil and/or roots during use.

A further object of the present invention is to provide a plant watering device which can be inserted into the soil quickly, easily, and conveniently.

One other object of the present invention is to provide a plant watering device including a container with a timer means for periodically and controllably supplying nutrients automatically to a perforated member installed within the soil.

These and other such objects of the present invention are attained by a device for watering plants comprising a sleeve having at least a portion thereof perforated by a first set of holes and adapted for having said portion positioned within soil. An inner member is accommodated within the sleeve. The inner member has at least a portion thereof perforated by a second set of holes registerable with the first set of holes. A means is provided for selectively moving the inner member between a first position in which the first and second sets of holes are in registration with each other, and a second position in which the first set of holes is blocked by a wall of the inner member.

Another aspect of the invention is directed to a device for watering plants comprising an elongated member having an axial direction and a circular cross section. A spiral ridge extends along the periphery of the elongated member from one end at least partially toward its other end. A means is provided at the other end for rotating the elongated member around its axis while exerting some force in the axial direction.

One other aspect of the invention is directed to a device for watering plants comprising a member having a first portion thereof adapted to be positioned in soil and a second portion thereof extending from the soil. A passage communicates the first and second portions. A container adapted for retaining water is provided along with a means for securing the container to the second portion of the member and for communicating the container with the passage. A means is also provided for selectively blocking communication between the container and the passage. A timer means actuates the blocking means at a preselected time.

BRIEF DESCRIPTION OF THE DRAWINGS

FIG. 1 is an exploded view in perspective of the various parts of a plant watering device in accordance with the present invention.

FIG. 2 is an enlarged perspective view of the head portion of the inner member shown in FIG. 1.

FIG. 3 is an enlarged perspective view of the sleeve shown in FIG. 1.

DETAILED DESCRIPTION OF THE PREFERRED EMBODIMENT

Figure 4:
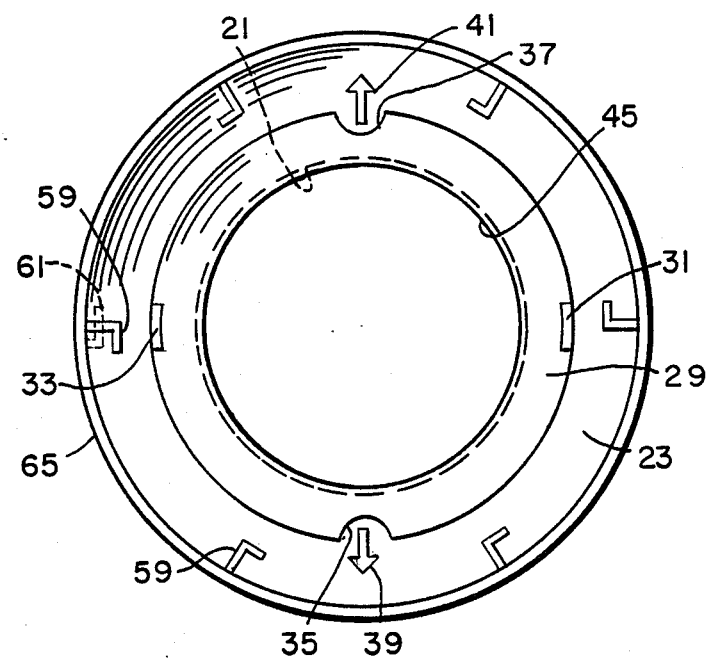
FIG. 4 is a top view taken along line IV—IV of FIG. 1.

FIG. 1 depicts a device of the present invention as comprised of sleeve 1, inner member 3, container 5, and timer 7. These parts are designed to fit together and, when assembled, to form one unit which functions to conveniently, efficiently, effectively, controllably, and periodically provide nutrients, such as water, to the root system of a plant (not shown).

Sleeve 1 is an elongated tube 9 having a tip 11, a main body 13, and a top 15. Tip 11 penetrates easily through the soil to facilitate the forcible insertion of sleeve 1 into the soil. Further assistance in this respect is lent by ridge 17 which spirally winds around the periphery of sleeve 1. A downward pressure on sleeve 1 must be applied in order to initially break through the top surface of the soil with tip 11. Subsequently, rotation of sleeve 1 once ridge 17 has dug into the soil will result in an easy and convenient travel downward through the soil down to the desired depth. Typically, that depth will be such that only head portion 15 protrudes from the soil.

At least body portion 13 of sleeve 1 is perforated by a plurality of holes 19 spaced along the periphery thereof. Holes 19 place the outside of sleeve 1 in communication with bore 21 forming the interior thereof. Consequently, water poured into bore 21 will flow outwardly through holes 19. With sleeve 1 being installed within the soil, water will, thus, be delivered to a depth defined by the location of holes 19. Depending on the particular size of the pot, the plant, and the depth of the root system, sleeve 1 can be suitably modified in terms of appropriate placement of holes 19 so that the most effective delivery of water to the proper depth can be selected.

Head portion 15 of sleeve 1 includes a collar 23. This collar serves a multiplicity of functions which will become clear below. Suffice it to say briefly at this point that it can be used for grasping the sleeve 1 in order to conveniently rotate it to take advantage of spiral ridge 17 for insertion of sleeve 1 into the soil. Also, collar 23 serves as a support surface for inner member 3. Finally, collar 23 includes means for securing container 5 to sleeve 1.

Inner member 3 is also a tube which is suitably sized to be received within sleeve 1. The two should have a relatively snug fit therebetween which, on the one hand, allows inner member 3 to slide and rotate relatively easily within sleeve 1 but, on the other hand, the spacing between the two should not form an annulus therebetween of such size that dirt can penetrate holes 19 even though a wall of inner member 3 blocks it. More details on this aspect of the invention will be provided below.

Inner member 3 includes a top portion 25 and a body portion 27. Top portion 25 includes a rim 29 of a diameter smaller than collar 23 of sleeve 1, as best shown in FIG. 4. Extending upward from rim 29 are opposed tabs 31 and 33. These are sized to be easily grasped one by, for example, a thumb and the other by an index finger to facilitate insertion and rotation of inner member 3 relative to sleeve 1. Preferably, tabs 31, 33 are concave to aid in grasping these tabs without the fingers slipping off as force is applied. Rim 29 also includes notches 35 and 37 in its outer periphery. These cooperate with arrows 39 and 41 on the upwardly facing surface of collar 23 of sleeve 1, as best shown in FIG. 4. The need for such an arrangement is explained below.

Body portion 27 of inner member 3 includes a plurality of holes 43 corresponding in number to holes 19 in sleeve 1. The position of holes 43 is also such that when inner member 3 is fully inserted into sleeve 1, rim 29 of inner member 3 rests on collar 23 of sleeve 1, and holes 43 can be brought into registration with holes 19. Specifically, inner member 3 is rotated until arrows 39, 41 are visible within recesses 35 and 37, respectively, this indicates that holes 43 have been brought into registration with holes 19. Consequently, water introduced into bore 45 of inner member 3 flows outward through holes 19, and to the exterior of sleeve 1. However, when arrows 39, 41 are not visible through recesses 35, 37, this reflects the fact that holes 43 are likewise out of registration with holes 19. Consequently, the wall of inner member 3 blocks holes 19. With holes 19 so blocked, and with the respective sizes of sleeve 1 and inner member 3 being such that minimal spacing exists between the walls thereof, foreign bodies such as dirt particles and/or roots will be incapable of entering holes 19.

The just-described configuration of sleeve 1 and inner member 3 has one further significant advantage. Holes 19 and 43 are defined by relatively sharp edges. This can be accomplished by virtue of the fact that the walls of sleeve 1 and inner member 3 are thin. Alternatively, the outer periphery of holes 19 and 43 can be manufactured to be thinner than the walls of these members. In either case, the object is to produce a scissor-like action when inner member 3 is rotated to place its hole 43 out of registration with hole 19 of sleeve 1. Thus, for example, if a root has somehow penetrated through holes 19 and 43 while they are in their registration position, rotation of inner member 3 to place the respective holes 19 and 43 out of registration will result in a snipping off of this root. In this manner, the holes can be kept clear of intruding roots so that adequate water flow to the roots is maintained.

Inner member 3 also includes a lower portion (not shown). This lower portion can be shaped to correspond to tip 11 of sleeve 1. Alternatively, it can be straight to form a flat bottom. In such a case, however, tip 11 of sleeve 1 would preferably not include holes 19 which would, in any case, likely become plugged during insertion and/or use. The bottom of the lower portion of inner member 3 will be the repository of roots and/or dirt which are cleared from holes 19 and 43 as a result of the rotation of inner member 3. In other words, such debris falls to the bottom of inner member 3. Periodic removal of inner member 3 from sleeve 1 is recommended so that inner member 3 can be emptied and then reinserted into place.

In operation, inner member 3 is inserted into position within sleeve 1 so that holes 43 are out of registration with holes 19. Consequently, holes 19 are blocked. In this position, sleeve 1 is pressed down onto the top surface of the soil until tip 11 penetrates a slight distance. Then, collar 23 is grasped and turned so that sleeve 1 is rotated to thereby insert it into the soil due to the action of spiral ridge 17. As the device is inserted into the soil in this condition, dirt will not be able to penetrate through holes 19 because of the blocking action of the wall of inner member 3. Once sleeve 1 has been placed into its final position within the soil, inner member 3 is rotated until arrows 39, 41 are visible through notches 35, 37. In this position, holes 43 are in registration with holes 19 so that water introduced into bore 45 can flow outward into the soil and, eventually, to the plant root system. After the watering is completed, inner member 3 can be left in that position or, alternatively, rotated to place holes 43 out of registration with holes 19. In the latter position, hole 19 will again be blocked so that soil cannot collapse into holes 19 nor can roots grow thereinto. However, this is somewhat inconvenient to do on a regular basis. Therefore, in an alternative mode, inner member 3 can simply be left in position so as to keep holes 43 in registration with holes 19. However, periodic rotation of inner member 3 relative to sleeve 1 will be required in order to snip off any intruding roots. Also, periodic removal of inner member 3 from sleeve 1 and the emptying of inner member 3 are required.

Figure 5:
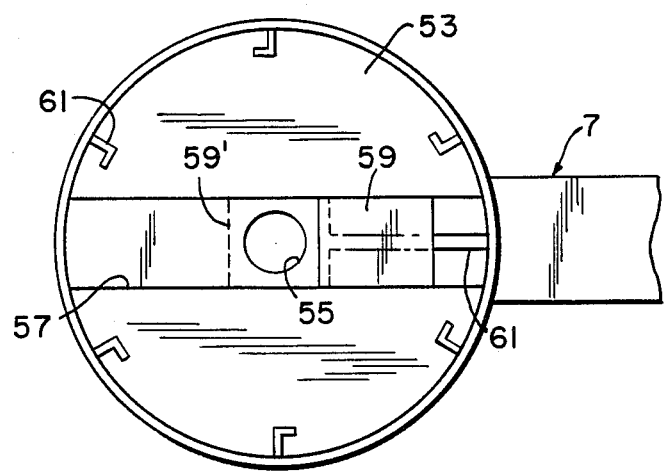
FIG. 5 is a view of the container from underneath showing an opening for water to flow therethrough and a means to controllably block it.

A further significant aspect of the present invention involves the capability to automatically supply nutrients to the plant when the owner is away or is otherwise incapable of doing so. To this end, a container 5 is provided which includes a reservoir 51 capable of retaining a desired supply of water. The size of the container will, of course, depend on the size of the plant and the maximum number of automatic waterings sought to be attainable. At the lower portion of container 5 is a bottom 53 in which hole 55 is formed. On the underside of floor 53, as best shown in FIG. 5, is provided a track 57 along which a block 59 is free to travel. Block 59 can move to a position shown in solid lines in which it is clear of hole 55. Also, block 59 can be moved into position 59' shown in dotted lines. In this position, block 59 closes off hole 55 and, thus, serves to prevent water from passing through hole 55 into bore 45 of inner member 3.

Block 59 includes a bar 61 extending therefrom into timer 7. Timer 7 includes a mechanism coupled to bar 61 for moving the block 59 between its two shown positions in which, respectively, hole 55 is either blocked, or not. The actuating mechanism in timer 7 can be spring loaded or electrical, for example. No further details are believed necessary since such mechanisms are conventional and well-known to anyone with ordinary skill in the art. Suffice it to say that timer 7 includes the provision for setting a time interval between waterings as well as a period of time for keeping hole 55 open to permit a specified quantity of water to pass out of it.

Timer 7 is detachably securable to collar 23. This is accomplished with interleavable fingers 59 on collar 23 and 61 on container 5. How they cooperate is best depicted in FIG. 4 which shows one instance of a finger 59 interleaved with a finger 61. It is to be understood that only one such structure is shown for simplicity whereas, in actuality, all six fingers on each part, respectively, cooperate in this manner. For assembly, container 5 is lowered onto collar 23 in such a position that fingers 61 thereof clear fingers 59 of sleeve 1. Rotation of container 5 clockwise, as shown in FIG. 4, causes a locking action so that container 5 can no longer be lifted from sleeve 1.

Sleeve 1 also includes a sealing ring 65 secured to the periphery of collar 23. It can, for example, be seated in an annular indentation and, in effect, acts like an O-ring. Container 5 is sized such that it seats against ring 65 to form a watertight seal. Consequently, when hole 55 is opened by timer 7, and water flows from reservoir 51, its only open flow path will be down bore 45, and lateral leakage is prevented by virtue of seal 65.

Although a preferred embodiment of the present invention is disclosed in detail above, it should be understood that various changes and modifications thereto can readily occur to one with ordinary skill in the art. For example, the material of which sleeve 1 and inner member 1 are constructed can be a metal or plastic, for example, as long as it is rigid enough to withstand the forces applied to it. If metal is utilized, it should preferably be rust resistant. If plastic is used, then the cutting action between holes 19 and holes 43 must be paid special attention because it is more difficult to attain with plastic than with metal parts. However, even the plastic can be molded or otherwise formed so as to have edges sharp enough to deal with tender roots as well as dirt particles. The size for the device of the present invention is dependent on the utilization to which it is put, and no limitations in this respect should be attributed to the disclosure of the preferred embodiment. For example, a large pot for large plants will utilize a relatively large scale device whereas, conversely, a small pot for a small plant will utilize commensurately smaller parts. The number and location of holes 19 and holes 43 is subject to many variations. Likewise, the type, construction, and location of an alternative seal to prevent leakage between container 5 and inner member 3 is also readily apparent. Interleavable fingers 59 and 61 can be replaced by another locking mechanism which utilizes rotation of container 5, for example, to accomplish the locking. One example is the use of tabs protruding radially from collar 5 which fit into a spiral groove extending at least partially around the inner periphery of container 5. In any case, even if fingers 59 and 61 are used, their number can be changed from six to more or less depending on container size. These and other such modifications are meant to be included within the scope of the present invention as defined by the following claims:

I claim:
1. A device for watering plants comprising:
   a tubular sleeve having at least a portion thereof comprised of a wall defining a first set of holes and adapted for having said portion positioned within soil;
   a tubular inner member snugly received within said sleeve and having at least a portion thereof comprised of a wall defining a second set of holes registerable with said first set of holes wherein the walls defining said first and second sets of holes include means for cutting an item protruding therethrough as said inner member is moved from a first position to a second position;
   first means accessible from above the soil and in communication with the interior of the tubular inner member for receiving water and passing it toward the soil; and
   second means extending above the soil for selectively moving said inner member between the first position in which said first and second sets of holes are in registration with each other, and the second position in which said first set of holes is blocked by the wall of said inner member, said inner member portion being rotatable around its longitudinal axis relative to said sleeve portion between said first and second inner member positions.

2. The device of claim 1, wherein said moving means includes a head portion of said inner member extending out of said sleeve and including a set of tabs adapted to be grasped by fingers.

3. The device of claim 1, wherein said sleeve comprises a collar against which the head portion of the inner member rests.

4. The device of claim 1, further comprising indicator means on said sleeve collar and said inner member head portion for indicating the relative first and second inner member positions.

5. A device for watering plants comprising:
a tubular member having a first portion thereof comprised of a wall defining a set of holes and adapted to be positioned in soil, a second portion thereof extending from said soil, and a passage communicating said first and second portions;
a container adapted for retaining water;
means for securing said container to said second portion of the member and for communicating said container with the interior of said second portion through said passage;
valve means for blocking said passage to prevent water flow therethrough; and
timer means for actuating said valve means to allow water flow from the Container to the soil through said set of holes at a preselected time.

6. The device of claim 5, wherein said securing means includes means for removably securing said container to said member.

* * * * *